United States Patent [19]

Forbes et al.

[11] Patent Number: 4,654,705
[45] Date of Patent: Mar. 31, 1987

[54] TWO CHANNEL AUDIO SCRAMBLING SYSTEM

[75] Inventors: Ronald L. Forbes; John A. Lund, both of McHenry; Harold E. Mann, III, Skokie, all of Ill.

[73] Assignee: Zenith Electronics Corporation, Glenview, Ill.

[21] Appl. No.: 567,108

[22] Filed: Dec. 30, 1983

[51] Int. Cl.⁴ ............................................. H04N 7/167
[52] U.S. Cl. ........................................ 380/19; 380/34; 332/23 A; 375/39; 370/20
[58] Field of Search ............... 358/121, 122, 124, 114, 358/144; 370/20; 179/1.5 S, 1.5 FS; 455/27, 42, 60, 29; 375/39; 332/23 A

[56] References Cited

U.S. PATENT DOCUMENTS

| 2,952,735 | 9/1960 | Weiss | 358/121 |
|---|---|---|---|
| 3,059,054 | 10/1962 | Reiter | 358/121 |
| 3,378,771 | 4/1968 | Gerwen et al. | 455/60 |
| 3,384,824 | 5/1968 | Grenier | 455/60 |
| 3,732,375 | 5/1973 | Kuribayashi | 370/20 |
| 3,824,332 | 7/1974 | Horowitz | 358/121 |
| 3,838,342 | 9/1974 | Bjorkman | 455/29 |
| 3,999,005 | 12/1976 | Dickinson | 358/114 |
| 4,123,710 | 10/1978 | Stuart et al. | 375/2.1 |
| 4,205,339 | 5/1980 | Howe | 370/20 |
| 4,244,053 | 1/1981 | Clinch et al. | 455/29 |
| 4,267,591 | 5/1981 | Wissel et al. | 370/20 |
| 4,312,072 | 1/1982 | Vogel | 455/29 |
| 4,339,772 | 7/1982 | Eilers et al. | 358/144 |
| 4,353,031 | 10/1982 | Bock | 375/39 |
| 4,389,671 | 6/1983 | Posner et al. | 358/121 |
| 4,410,911 | 10/1982 | Field et al. | 358/121 |
| 4,560,961 | 12/1985 | Kestenbaum | 332/23 A |
| 3,809,817 | 5/1974 | Gill et al. | 370/20 |

OTHER PUBLICATIONS

"Stereophonic TV Sound", Electronics, 10/30/59.

Primary Examiner—Stephen C. Buczinski
Assistant Examiner—Aaron J. Lewis

[57] ABSTRACT

A two channel audio scrambling circuit for a television signal encoding system includes synchronized digital carrier switching means for deriving two suppressed carrier, switched audio signals that are 90 degrees apart, and combining them into a single output signal. A digital phase shifter, supplied with a carrier related to the horizontal line frequency develops properly phased outputs for controlling electronic switches to produce two phase displaced digital carrier switching signals. A plurality of scrambling modes are determined by logic means under control of a vertical interval signal, a video inversion signal and a tone signal input for controlling the digital phase shifter to change the carrier frequency. Complementary decoding circuitry for recovering the so-encoded audio signals is also described.

3 Claims, 3 Drawing Figures

TWO CHANNEL AUDIO SCRAMBLING SYSTEM

BACKGROUND OF THE INVENTION

This invention relates generally to audio scrambling and unscrambling systems and particularly to a two channel audio scrambling and unscrambling system for use in conjunction with a pay television signal encoding system.

Pay television systems, which are normally operated in connection with cable connected television subscription services, have grown in popularity and have given rise to a need for added security to restrict certain programming to those who have specifically subscribed and paid for it. Common techniques for television signal encoding include suppressing the horizontal sync pulses and randomly inverting the video information. The audio portion of the program may also be encoded by a number of well known techniques.

A copending application of two of the co-inventors of the present application, entitled "Dynamic Audio Scrambling System", Ser. No. 564,973, filed Dec. 21, 1983 in the names of J. Lund and R. Forbes and assigned to Zenith Radio Corporation, describes a prior art audio encoding/decoding scheme involving modulating audio information with a small offset frequency to displace the entire audio information spectrum upwards in frequency and the improvement in randomly changing the offset frequency to enhance system security.

There is a perceived need in pay television systems for stereo sound, that is audio information that is derived from two related audio channels. The technique of the copending application can be used for stereo sound, or for two channel sound, by simply doubling the system. Such an approach would surely involve substantially higher costs and an increase in bandwidth. The present invention provides the enhanced security of the system of the above application with stereo signals.

OBJECTS OF THE INVENTION

A principal object of the invention is to provide a novel audio scrambling/unscrambling system.

A further object of this invention is to provide a novel audio scrambling/unscrambling system for use in a television encoding system.

A still further object of this invention is to provide a secure stereo audio encoding system at a low cost.

SUMMARY OF THE INVENTION

In accordance with the invention, a two channel audio scrambling system comprises first and second audio signals and a carrier signal, means for generating first and second suppressed carrier quadrature modulated signals from the audio signals and the carrier signal, the suppressed carrier signals bearing a 90 degree phase relationship to each other, means for combining the generated signals into an output signal and means for changing the frequency of the carrier signal to displace the frequency spectrum of the output signal. Encoded signals are decoded in a complementary manner.

BRIEF DESCRIPTION OF THE DRAWINGS

Other objects and advantages of the invention will become apparent upon reading the following description thereof in conjunction with the drawings in which.

DESCRIPTION OF THE PREFERRED EMBODIMENT

The general technique of audio scrambling (encoding) and unscrambling (decoding) based upon changing the carrier frequency to displace the audio information in the frequency spectrum is known from the prior art and from the copending application. Similarly, the technique of quadrature amplitude modulation to produce a suppressed carrier, double sideband signal is also well known. The system of the invention is directed to a novel combination which utilizes these two techniques.

Figure 1:
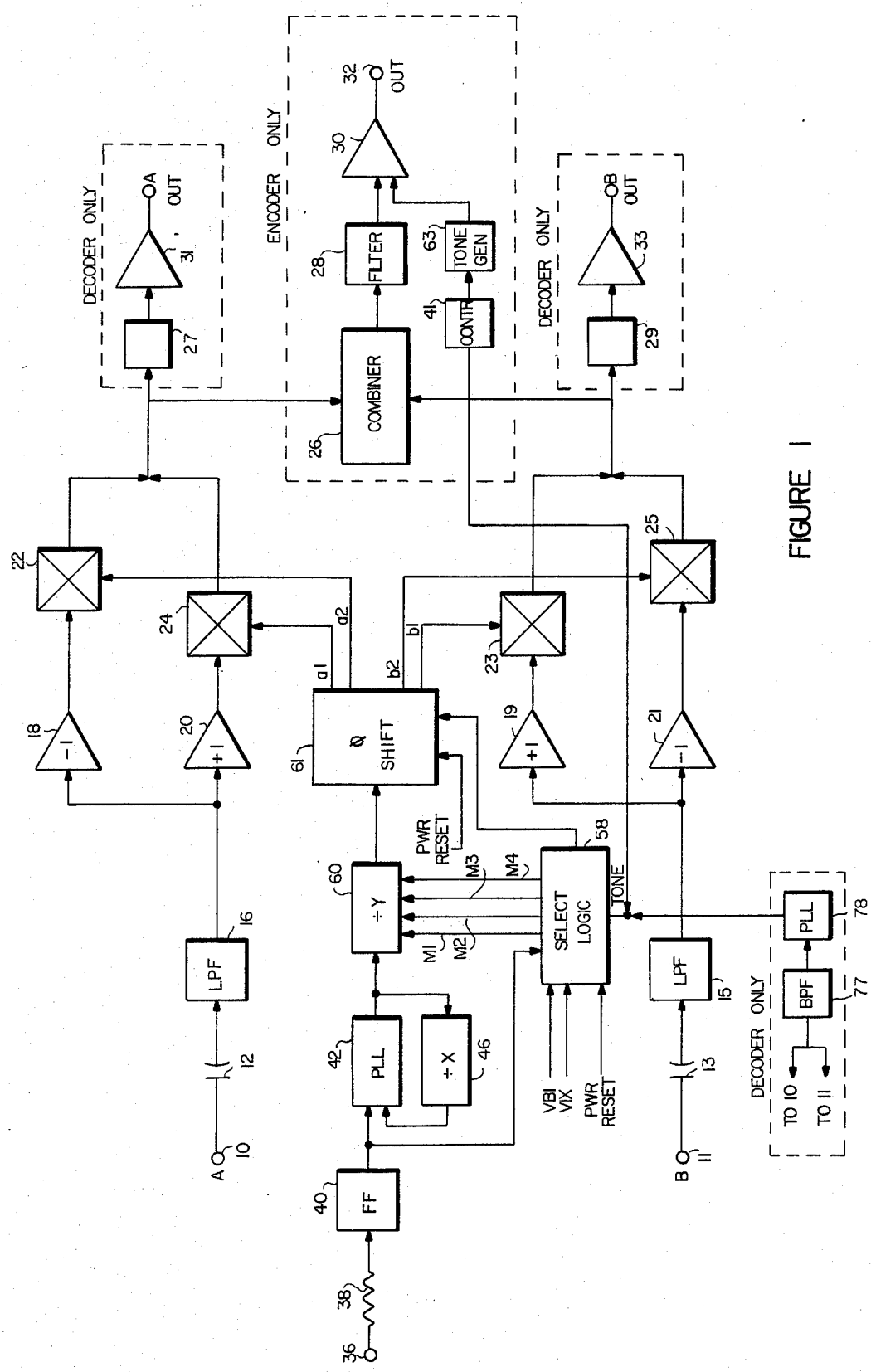
FIG. 1 represents a combined schematic and block diagram of an encoder/decoder for scrambling/unscrambling two channel audio information in accordance with the invention.

With reference to FIG. 1, the elements enclosed within the various dashed line boxes are labeled to indicate their use in the encoder or decoder of the system. In general, encoding will be described with occasional reference to decoding. An input terminal 10 labelled channel A receives baseband audio information ranging in frequency from 50 Hz to 15,000 Hz. The information is passed through a capacitor 12 to a low pass filter 16, where frequencies above the audio frequency of 15 KHz are removed, before being supplied to a pair of amplifiers 18 and 20 for producing 180 degrees out-of-phase replicas of the input signals. The outputs of amplifiers 18 and 20 are suitably coupled respectively to a pair of electronic switches 22 and 24 which operate in synchronism to alternately select the output of amplifier 18 and the output of amplifier 20, all under control of a switching carrier, as will be described. The outputs of electronic switches 22 and 24 are combined and supplied to a combiner circuit 26.

Similarly, a channel B includes an input terminal 11 which supplies a second audio signal, through a capacitor 13, to a low pass filter 15, the output of which is, in turn, supplied to a pair of amplifiers 19 and 21 identical to amplifiers 18 and 20. Amplifiers 19 and 21 similarly supply a pair of electronic switches 23 and 25 which are also under control of switching carriers that are 180 degrees phase displaced with respect to each other and 90 degrees phase displaced with respect to the corresponding switching carriers that drive electronic switches 22 and 24. The output of switches 23 and 25 is supplied to combiner circuit 26 and the output of the combiner circuit, which includes interleaved suppressed carrier signals from channel A and from channel B, is supplied to a filter 28 and to a buffer amplifier 30 to an output terminal 32 for transmission.

A tone generator 63, under control of a control circuit 41, also supplies an input to buffer 30. Tone generator 63 periodically introduces an audio tone of predetermined frequency into the output circuit for initiating changes in scrambling modes. Elements 26, 28, 30, 32, 63 and 41 are only used in an encoder as indicated by the appropriately labeled dashed line enclosing them.

A television horizontal line frequency signal is supplied to a terminal 36 and, through a current limiting resistor 38, to a monostable flip flop (FF) 40 which develops a square wave output H of horizontal frequency, in response to the pulsed horizontal input signal. FF 40 is provided to preclude the double frequency horizontal pulses in the television signal vertical interval from appearing in its output. The output of FF 40 is coupled to a phase lock loop (PLL) 42 which operates to develop an output frequency, preferably between 2 and 4 MHz. The output of PLL 42 is coupled to a divider 46, the output of which is returned to the PLL input. The output of PLL 42 is also coupled to a digital phase shifter circuit 61 and to a divider 60 which, in turn, supplies the carrier signal input to phase shifter circuit 61. The output of phase shifter circuit 61 includes the switched digital carriers, indicated by "a1", "a2" and "b1" and "b2". As illustrated, the switched digital carrier signals "a1" and "a2" and "b1" and "b2", respectively, bear 180 degree phase relationships to each other, with a 90 degree phase relationship existing between the "a" group and the "b" group. These switched carrier signals are supplied to respective ones of electronic switches 22–25 for producing the two suppressed carrier amplitude modulated signals for combiner 26.

Another output of FF 40 is supplied to a select logic block 58 which represents the selection means for determining the offset or displaced carrier operating modes M1–M4, as fully described in the above-mentioned copending application. The inputs to select logic 58 are a vertical interval signal (VBI), a video inversion signal (VIX), and a power reset signal, in addition to the horizontal signal H from FF 40. A tone input terminal is supplied from control circuit 61. The output signals of select logic 58 are indicated as M1–M4 and a VBI count signal that is supplied to phase shifter 61. A power reset signal and a PLL 42 output signal labelled FPLL are also supplied to phase shifter 61. The combination of the VBI and VIX signals and the audio tone input is used to determine the system scrambling modes for generating output switching carriers that are displaced with respect to each other by different predetermined frequencies. The divide ratios X and Y of divider 46 and divider 60, produce carriers that are offset by small fractions of the horizontal line frequency from each other. In the preferred embodiment, the nominal carrier frequency has a frequency between H and 2H, where H equals 15,735 Hz, the television horizontal line frequency.

In the decoder implementation, the outputs of switches 22, 24 and 23, 25 are not supplied to combiner 26 but to suitable filter and buffer combinations. Thus filter 27 and buffer 31 provide the decoded B channel output. Input terminals 10 and 11 are connected together and through a bandpass filter 77 to a phase lock loop/detector 78 to the tone input of select logic 58. All other elements are identical and operate to decode the encoded signal into its channel A and B components by changing the demodulating carriers in accordance with the scrambling mode. This is determined by select logic 58.

Figure 2:
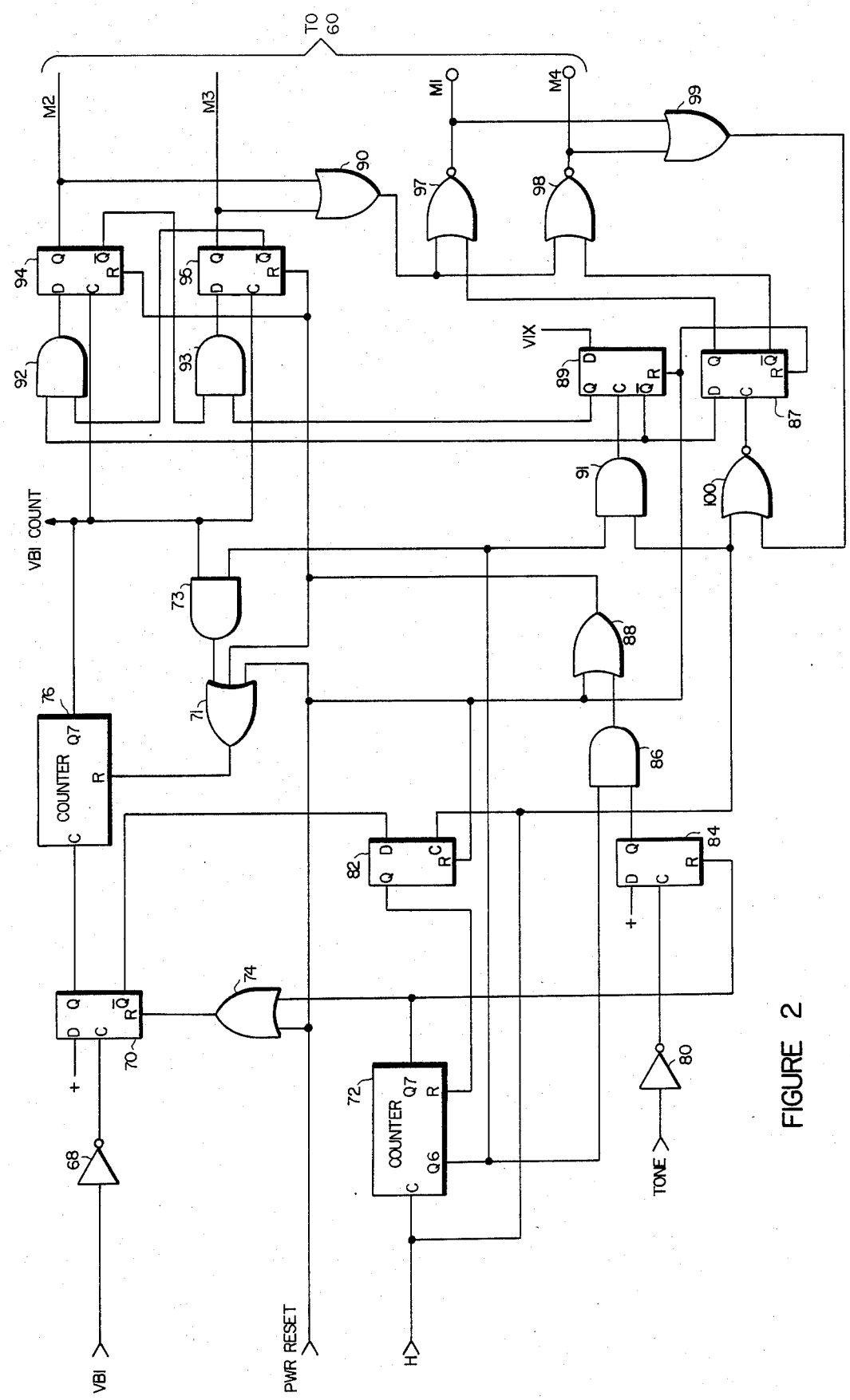
FIG. 2 is a logic diagram of the selection means of FIG. 1.

In FIG. 2, the detail logic circuit of select logic 58 is shown. As indicated, this circuit may also be used for both the encoder and decoder. The vertical interval VBI signals are supplied through an inverter 68 to set a latch 70 for passing the successive vertical interval signals to clock a counter 76. When latch 70 is set, its Q terminal is high and its $\bar{Q}$ terminal is low. When the unit, that is the encoder or decoder, is turned on, a power reset pulse latches 82, 87 and 89 directly, resets latch 70 through an OR gate 74 and resets latches 94 and 95 through an OR gate 88. Counter 76 is reset through an OR gate 71. This series of events sets the select logic circuit for operation in mode 1.

The horizontal input signal H clocks a counter 72 having outputs Q6 and Q7. When a particular count has been reached by counter 72, Q7 goes high which results in resetting of a latch 84. The Q6 output of counter 72 and the input VIX provide proper signals to set latch 89 and develop a latched VIX signal at its Q output.

The input to latch 84 is a digital signal derived from a tone of predetermined frequency in the output of PLL/detector 78 in FIG. 1 and is supplied through an inverter 80. It will be appreciated that a data signal, such as a pulse signal, may be provided rather than an audio tone. In that event, PLL/detector 78, BPF 77 and the tone generator in FIG. 1 would not be needed. Counter 72 and latch 84 establish a starting point for mode scrambling. If latch 84 has been set, it will be reset at a known point when counter 72 counts a predetermined number of horizontal lines after the vertical interval signal. Since the Q terminal of latch 84 is connected to an AND gate 86 along with the Q6 terminal of counter 72, setting of the latch enables AND 86, the output of which is connected to OR 88 which sets operation for mode 1 or for mode 4 (mode 1/4) and resets counter 76.

The Q7 output of counter 72 is connected to the reset terminal of latch 70 through OR 74 and the $\bar{Q}$ terminal of the latch is connected, via a latch 82, to the reset terminal of the counter. The power reset circuit makes the Q output of latch 82 high on the next pulse, which inhibits counting of counter 72. The next VBI signal supplied to latch 70 sets the latch, driving its $\bar{Q}$ terminal low. The Q output of latch 82 then goes low on the next pulse enabling counter 72 to count horizontal lines. Further VBI pulses clock counter 76. When counter 76 reaches a predetermined count, it sets either latch 94 or 95, depending on the VIX latch 89 status of that time. This causes the mode to change from 1/4 or 2/3, depending on the current VIX latch 89 state.

Nothing further in the way of mode changing occurs until a tone signal is detected and sets latch 84. The Q output of latch 84 goes high and enables AND 86. When Q6 of counter 72 goes high, indicating a given number of horizontal pulses have been counted, AND 86 operates to set a return to mode 1/4 through OR 88. When counter 72 counts up until Q7 goes high, it resets latch 84 to disable AND 86. Latch 70, via latch 82, resets counter 72.

The four different scrambling modes are determined by the various signals and the interconnection of AND gates 90, 92, 93, 97, 98 and 99 and latches 94 and 95. The output of OR 88 is connected to the reset terminals of latches 94 and 95 which are reset to drive their $\bar{Q}$ terminals low and their Q terminals high. This occurs when the unit is turned on or when AND 86 is operated, in resonse to a predetermined horizontal line count by counter 72 and the presence of a tone signal. OR 88 is also connected to OR 71 for resetting counter 76.

The Q output of latch 94 denotes the second scrambling mode M2 and the Q output of latch 95 denotes the third scrambling mode M3. When reset, these Q outputs are both low and the corresponding $\bar{Q}$ outputs are high. When the Q outputs of both latches 94 and 95 are low, the output of OR gate 90 goes low enabling NOR gates 97 and 98. The output of OR 90 may be used directly to initiate mode 1 operation. NOR's 97 and 98 are supplied with high or low logic level signals as a function of the presence or absence of the VIX signal. The latched VIX signal from the Q terminal of latch 87 is connected directly to the second input of NOR 97 and the $\bar{Q}$ terminal of latch 87 is connected directly to an output of NOR 98. If the previous VIX signal at the Q output of latch 87, at the time of reset of latch 94 and latch 95 is low, mode 1 is selected. If the inversion signal is present, represented by the $\bar{Q}$ output of latch 87 being low, mode 4 is selected. As described above, upon initial power on to the unit, mode 1 is selected. When either mode 1 or mode 4 is selected, the output of OR gate 99 goes high and latch 87 is inhibited from changing via NOR gate 100. As a result, a later change in the current real time VIX status, as represented by latch 89 will not cause a mode change from mode 1 to mode 4 or vice-versa, prior to the Q7 output of VBI counter 76 going high or a tone signal input being received.

Counter 76, on the other hand, is enabled to begin counting again by removal of the high level signal from its reset terminal. When counter 76 reaches a predetermined count, its Q7 output sets either latch 94 or latch 95, depending upon the status of latch 89, and through OR 90, terminates operation in mode 1/4. When Q7 of counter 76 goes high, it also enables AND 73 so that when the Q6 output of counter 72 goes high, counter 76 will be reset via OR gate 71. Depending upon the high or low state of the VIX latch 89, either AND 92 or AND 93 will be activated to set its corresponding latch upon Q7 of counter 76 going high. If the Q output of VIX latch 89 is low, $\bar{Q}$ is high and AND 92 sets latch 94, driving its Q terminal high and establising mode 2 operation. The $\bar{Q}$ terminal of latch 94 goes low and disables AND 93 to preclude operation of latch 95. If the Q output of VIX latch 89 is high, $\bar{Q}$ is low and AND 93 sets latch 95 to establish mode 3 operation and cuts off AND 92. The VIX signal presented to the D input of latch 89 is latched when Q6 of counter 72 and H are both high. Latch 87 is updated to latch 89 status at the H rate when in mode 2 or mode 3. The mode switching is random since the VIX signal is dependent upon the level of video information in the television signal. Also the tone signal is controllable by the system operator, either externally or in response to some aspect of the television signal. As mentioned, the tone detector and latch circuitry for AND 86 may be replaced by a timed data pulse input signal. Other variants will be readily apparent. While any single mode with a displaced switching carrier is sufficient to make the detected stereo audio unintelligible, the variety of scrambling modes adds to the system security. Thus, with a limited amount of logic hardware, a relatively secure two channel audio scrambling system is obtained.

Figure 3:
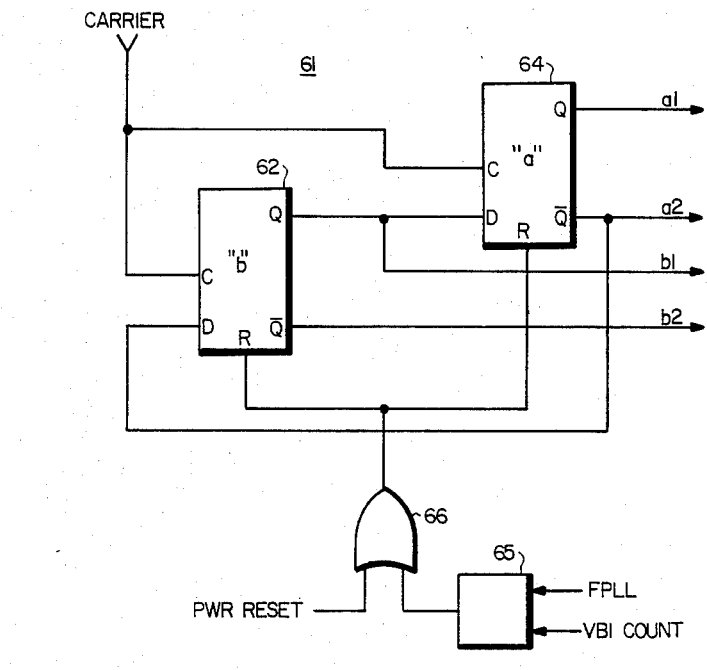
FIG. 3 is a schematic diagram of the switching carrier phase shift circuit of FIG. 1 with the phase relationship between the output switching signals shown.
Figure 3:
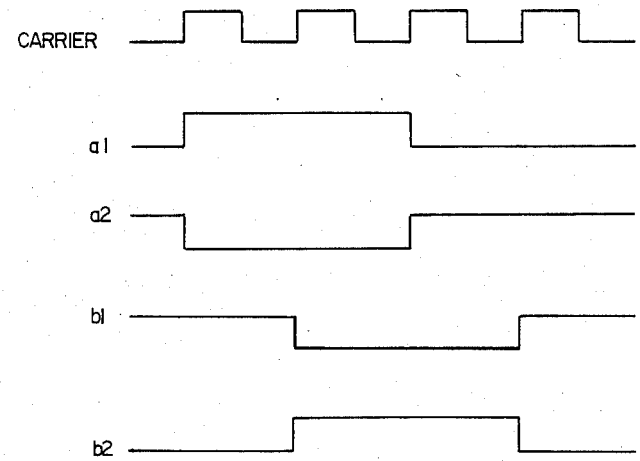

FIG. 3 discloses the logic details of phase shifter circuit 61. Phase shifter 61 receives the carrier and produces therefrom four output switching signals which bear precise phase relationships to each other. These output signals control operation of the electronic switches for the two channels to produce the two 90 degrees phase related suppressed carrier quadrature modulated signals. The carrier is supplied to the clock inputs of a pair of latches 62 and 64. The Q output of latch 64 develops the "a1" signal. Q of 62 is connected to the D terminal of latch 64 and develops the "b1" signal. $\bar{Q}$ of latch 64 develops the "a2" signal and is connected to the D terminal of latch 62. $\bar{Q}$ of latch 62 develops the "b2" signal. The reset terminals of both latches are connected through an OR gate 66 to the power reset signal and to a logic block 65 supplied with the VBI count signal from counter 76 and the FPLL signal from PLL 42. These signals are used to develop a phase synchronizing signal for assuring the proper timing relationship between the modulating and demodulating switching signals in the encoder and decoder. Thus, the latches are reset in response to an initial power reset signal and in response to the phase sync signal from logic block 65. As illustrated to the right, the carrier is a square wave with the "a1", "a2", "b1" and "b2" switching signals being latched in response thereto. The "a1" and "a2" signals are always 180 degrees out of phase with respect to each other, as are the "b1" and "b2" signals. It will be further noted that the "a" signals and the "b" signals are always 90 degrees phase displaced with respect to each other. This relationship is, of course, critical in the operation of the quadrature modulation system.

What has been described is a novel dynamically encoded two channel audio system which provides a high degree of security at low cost. It is recognized that numerous modifications and variations in the described embodiment of the invention will be apparent to those skilled in the art without departing from the true spirit and scope thereof. The invention is to be limited only as defined in the claims.

What is claimed is:
1. A two channel audio scrambling system comprising:
   first and second audio signals;
   a carrier signal that is related to the horizontal line scanning frequency of a television signal;
   means for generating two suppressed carrier, quadrature modulated, signals from said first and second audio signals and said carrier signal, said means including digital carrier phase shifting means having a pair of latches for generating two 90 degrees phase displaced sets of switching signals, one set for each said channel, with the signals in each set being 180 degrees phase displaced;
   means for combining said two suppressed carrier signals into an output signal; and
   means for changing the frequency of said carrier signal to displace the frequency spectrum of said output signal.

2. A decoder for a two channel audio scrambling system having an output signal consisting of two 90 degrees phase displaced, interleaved offset suppressed carrier amplitude modulated audio signals comprising:
   means generating a carrier signal related in frequency to the horizontal line frequency of a television signal;
   digital carrier generating means for generating from said carrier signal two sets of 90 degrees phase displaced switching signals, with the signals in each set being 180 degrees phase displaced with respect to each other, said digital carrier generating means including a pair of interconnected latches; and
   means for offsetting the frequency of said generated carrier signal to match the offset of said suppressed carrier for demodulating said output signal.

3. The decoder of claim 2, wherein said scrambling system includes a plurality of scrambling modes characterized by different offset carriers, and wherein encoding logic means are included for determining the scrambling mode of said output signal; and
   decoding logic control means for changing the frequency of said generated carrier signal to match the offset frequencies of said suppressed carrier.

* * * * *